US005352888A

United States Patent [19]

Childress

[11] Patent Number: 5,352,888

[45] Date of Patent: Oct. 4, 1994

[54] METHOD AND APPARATUS FOR DETECTING AND UTILIZING FRAME FILL INFORMATION IN A SORTING MACHINE HAVING A BACKGROUND AND A COLOR SORTING BAND OF LIGHT

[75] Inventor: Joel P. Childress, Sugarland, Tex.

[73] Assignee: ESM International, Inc., Houston, Tex.

[21] Appl. No.: 54,160

[22] Filed: Apr. 26, 1993

[51] Int. Cl.[5] .................................... G01N 9/04

[52] U.S. Cl. .................................... 250/223 R; 209/586; 382/8; 356/386

[58] Field of Search .................... 250/223 R, 560, 226, 250/222.2, 222.1; 209/586, 587, 564, 582; 382/8, 41, 1, 18; 356/379, 385, 386

[56] References Cited

U.S. PATENT DOCUMENTS

| | | | |
|---|---|---|---|
| 3,808,447 | 4/1974 | Leavens, Jr. | 250/223 R |
| 4,096,949 | 6/1978 | Hoover et al. | 250/223 R |
| 4,147,619 | 4/1979 | Wassmer et al. | 250/223 R |
| 4,647,211 | 3/1987 | Browne et al. | 356/447 |
| 4,666,045 | 5/1987 | Gillespie et al. | 209/585 |
| 4,825,068 | 4/1989 | Suzuki et al. | 250/223 R |

FOREIGN PATENT DOCUMENTS 8606305 11/1986 PCT Int'l Appl. .

*Primary Examiner*—David C. Nelms

*Assistant Examiner*—Que T. Le

*Attorney, Agent, or Firm*—Vaden, Eickenroht, Thompson, Boulware & Feather

[57] ABSTRACT

Apparatus and method for measuring the reflectivity of a product for use in optical sorting machines that is insensitive to product size and orientation. The percentage reflectivity of a product passing a background is corrected by a frame fill factor, which is representative of the percentage of the viewing frame occupied by the product being sorted.

23 Claims, 5 Drawing Sheets

FIG. 5a
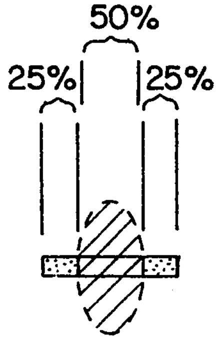
FIG. 5b
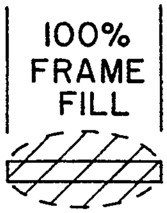
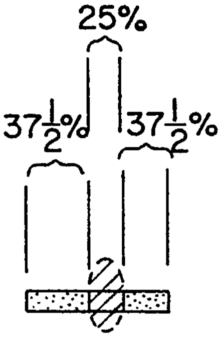
FIG. 5c
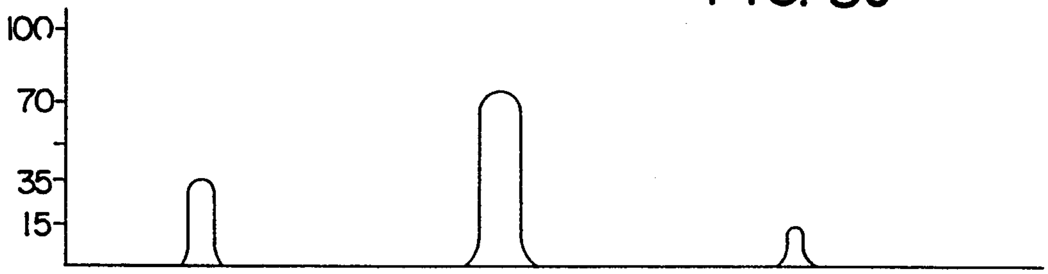
FIG. 5d
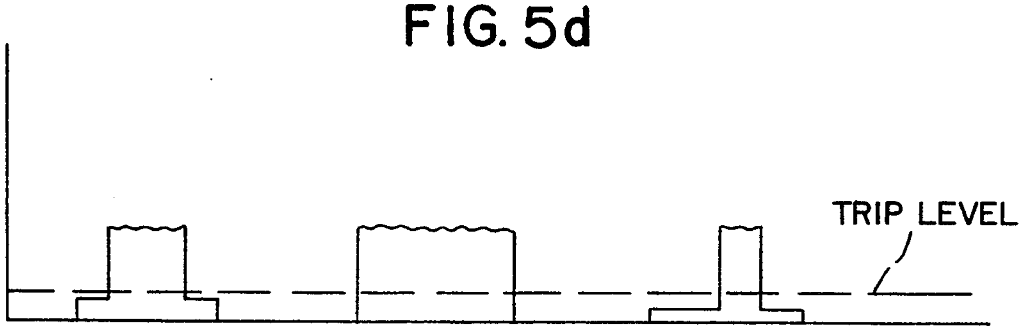
FIG. 5e
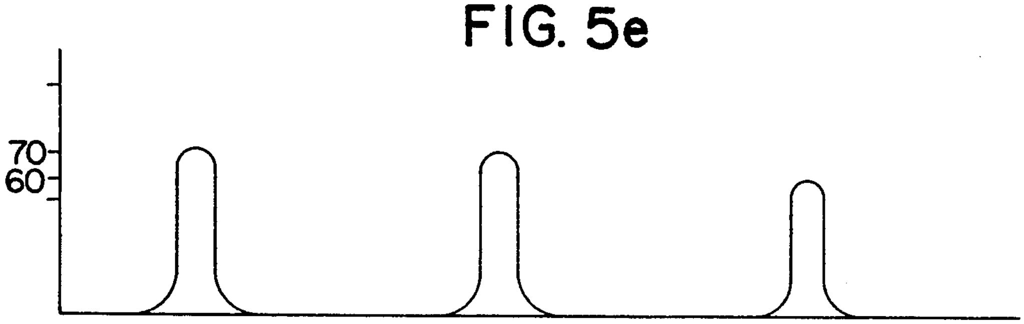
FIG. 5f

METHOD AND APPARATUS FOR DETECTING AND UTILIZING FRAME FILL INFORMATION IN A SORTING MACHINE HAVING A BACKGROUND AND A COLOR SORTING BAND OF LIGHT

BACKGROUND OF THE INVENTION

1. Field of the Invention

This invention pertains to methods and apparatus for sorting homogeneous products flowing in a product stream based on color reflectivity of the products in one or more reflectivity bands of light and more specifically for consistently color sorting such products using a dark contrasting background and pixel detectors associated with a viewing frame.

2. Description of the Prior Art

Homogeneous products, such as coffee beans, are sorted or graded most conveniently in optical or color sorting machines based on the amount of light that is reflected in one or more bands of reflectivity. Such sorting is sometimes referred to as being either monochromatic or multichromatic. For example, darker beans reflect less light in certain selectable frequency bands than lighter color beans. When unsorted or ungraded beans are conveyed, typically by gravity feed down a chute, they are transported through an optical viewing station and observed by one or more optical sorting assemblies. Each assembly typically includes one or more lights directed at the stream of products to be sorted, which cause reflection from the products in one or more frequency bands of light selected for use for sorting purposes. A photodetector sensitive to a sorting band is positioned to receive the reflected light and produces an electrical signal that is proportional to the amount of reflectivity in the sorting band. If the amount of reflected light is within acceptable limits, then the amplitude of the signal produced is within acceptable limits. However, when a product is photodetected that is too dark or too light, the reflectivity in the color sorting band will likewise respectively be less than or more than the respective predetermined threshold levels or limits and, thus, will produce an electrical signal having an amplitude that is either too small or too large. These electrical limits are sometimes referred to as "trip line values".

When a trip line value is exceeded in either direction from the acceptable amplitude range, an ejection signal is produced at a time when the detected product to be removed from the product stream is opposite an ejection mechanism, usually an activated jet of air.

It is very common to view the product stream simultaneously from more than one direction, each direction being associated with a similar optical sorting assembly so that a spot on a product that should cause its ejection is not hidden from view. That is, a spot will always be seen by at least one of the assemblies regardless of how the products are oriented as they tumble and rotate in the product stream trajectory. For example, it is common to employ three optical sorting assemblies separated at 120° locations in a plane orthogonal to the product stream trajectory. An ejection signal from any one of the three assemblies causes a product ejection.

In addition, it is also common to employ additional optical sorting assemblies with photodetectors sensitive to a second frequency color band, which would classify such sorting as biochromatic. Thus, acceptable products must be within an acceptable reflectivity range in each of two color sorting bands, not just one. In other words, a product that has a reflectivity response outside of the acceptable range in either color sorting band will be ejected from the stream.

Since reflectivities in selected color bands are the criteria for sorting, it is desirable to detect only the product and not background. In fact, if the background is not a contrasting color from the products being sorted, there may be a difficulty in detecting when a product enters the viewing station. Thus, a contrasting background achieved by painting or by lighting or a combination of both is useful. It is obvious that the background alone appears between products in the product stream and can be ignored or largely eliminated from the product detection operation by only activating the photodetection operation on the basis of detecting the presence of a product in position before the photodetectors at the time of generating the photodetection responses. The contrast background, which can be dark or black, allows the detection of the onset of a product.

However, it is not possible to totally eliminate the effect of background only by timing the photodetection event since the photodetectors observe everything within their respective fields of view whenever they are activated. This observation may simultaneously include a product and a portion of the background, as well. A procedure employed to minimize the amount of background simultaneously observed with the product is the use of a viewing window or frame, usually an elongated slot, placed in front of the photodetector. Such a frame cuts off viewing outside of a small exposed viewing area, where the products are expected to pass. The smaller the frame, the greater the elimination of extraneous reflectivity from the background.

Frames that are too small, however, cause other problems. One problem is that by reducing the size of the viewing area, there is also a reduction in the quantity of products that can be sorted in a given amount of time. If the viewing area is reduced too much, then some products may not be completely viewed and very small products possibly could be missed altogether. A frame that is smaller than the diameter or width of many of the products in the stream also may block off or shield a spot on a product that should cause its ejection or removal as being non-acceptable. Therefore, viewing frames are typically sized so that a portion of the background is viewed along with the detected products.

Although it is possible to appropriately contrast the background with the acceptable sorting color bands, it is not easy to maintain a background color when achieved by painting or lighting because of dust and other contaminants that accumulate and discolor the background. Since the background is photodetected to whatever extent it fills the frame that is not covered by a product, a constantly changing background can have an effect on sorting sensitivity. Moreover, it should be noted that a contrasting background used in conventional sorting machines has a greater effect on a small product than a larger one. This is because a small product passing by the viewing frame may be only a small fraction of the overall frame and, therefore, its effect is not as large as the effect of a proportionally larger product with respect to the background reflectivity during sorting. Thus, it may be possible for small products that should be ejected to escape being ejected. By contrast, a large product may block out most of the background and will be the major influence on the overall reflectivity for the observation of that particular product. Thus, the background is not a consistent influence on each product observation, even though sorting by color is supposed to be size insensitive.

There are other sorting machines that do not employ viewing frames and which do use matching backgrounds. Not only do such machines suffer some of the same problems as discussed above with respect to maintaining a background color in operation, it is also apparent that a machine employing a product matching background is not easily converted to sort a different product since the background would also have to be changed.

It is desirable to sort products on the basis of product reflectivity without taking background into account, on the basis of reflectivity independent of size or a particular trajectory and to be able to use the machine for sorting different products without changing background.

A system for calculating the amount of frame fill in a sorting machine is disclosed in U.S. Pat. No. 4,647,211, commonly assigned ("'211 patent"). In such a system, a light emitting diode (LED) in the infrared spectrum is employed as the light source to illuminate the area behind the product stream. A light box using a diffuser is employed, the backgrounds thereof being established to contrast with the product being sorted. The light from the LED is modulated by pulsing the LED at a frequency above the response frequency or frequencies used for sorting the products as reflected from the light of the incandescent lamps generally illuminating the products in the product stream. For systems employing more than one optical assembly in the same orthogonal plane, the respective LED light sources of the assemblies are also time multiplexed so that only one light source is operable at a given time. A photocell is located on the opposite side of the product stream trajectory from the LED with which it operates and a viewing frame is established in front of the photocell. Thus, a product in the product stream obscures the modulated light beam observed by the photocell in that part of the frame occupied by the product. The amount of pulsed voltage output from the photocell to its preamplifier is proportional to the amount of pulsed light resulting from the non-obscured portion of the frame. Thus, the resulting signal distinguishing product from background is useful in allowing the reflectivity monitoring to occur only with respect to product and not with respect to background.

It is apparent that the scheme outlined above and disclosed fully in the '211 patent for determining frame fill involves modulation and time control electronics, as well as a special frequency LED light source that is apart from the ambient incandescent light sources. Although such scheme does achieve the desired results, it is complex when compared to the instant arrangement not employing modulation or time multiplexing.

Therefore, it is a feature of the present invention to provide an improved method of sorting by detecting the background apart from the products in a product stream by using a contrasting background, preferably a black cavity.

It is another feature of the present invention to provide an improved method of sorting by determining the percentage of overall frame fill that is occupied by the product being viewed through the viewing frame compared with the overall width of the frame and using that information to correct the amplitude of the reflectivity signal so that all products of the same color in the product stream produce the same corrected amplitude value.

It is still another feature of the present invention to provide an improved apparatus for implementing the inventive methods disclosed herein.

SUMMARY OF THE INVENTION

The inventive method herein employs the establishment of a contrasting background to the color sorting bands employed behind the product stream being sorted. Normally, this will be a black cavity, which may be employed rather than a painted or light diffusing surface since there is no light shining on or through a background plane, such as with the arrangement shown in the '211 patent. The viewing frame through which the reflected light from the lamps illuminating the product stream is directed is viewed by a plurality of light detectors, such as CCDs, spanning the width of the viewing frame, each detector being located at a respective pixel location. A product causing reflectivity will be detected by those pixel detectors opposite the product, but the background will be detected at the same time by all the other pixel detectors. Thus, when the outputs of all the pixel detectors are scanned, only those pixel detectors opposite the product will produce an output larger than a trip line value representing a background level.

A photodetector for detecting the color sorting band is positioned to view the product through the same size viewing frame as for the pixel detectors and thus produces a raw output signal that is proportional to the total reflectivity of the product and background combination that is viewed. A small product will thus produce a different amplitude signal than a larger product of the same color. As noted above, the frame fill output signals for the two products will not be the same either. The frame fill output signal developed in the manner described above is converted to a percentage value of the entire frame width and is then used to divide into the respective raw signal amplitudes from the photodetector for the respective products, thereby producing "corrected" photodetected signals that are of equal value for the same color product regardless of its frame fill size.

The pixel detectors can be sensitive to the color band (for a monochromatic sorter) or one of the color bands (for a biochromatic sorter). However, these pixel detectors can also be sensitive to another color band, if desired. One reason for using another color band is to provide different sorting of homogenous products when the sorting scheme involves grading in another color band or to provide different color band sorting of homogeneous products from the sorting of non-homogeneous products. Such nonhomogeneous products include, for example, rocks, dirt clods, and plant twigs. These non-homogeneous products are known to have reflectivity characteristics entirely different from the homogeneous products being sorted. Therefore, the pixel detectors are employable with one trip level value with respect to product differentiation and another larger trip level value with respect to nonhomogeneous materials, as operationally desirable. Appropriate ejection mechanisms may be used differently to exclude such non-homogeneous products or debris from the product stream and also from the homogeneous products that are sorted from the stream, as desired. The combined outputs of these detectors are thus usable not only for developing a frame fill output value as discussed above with respect to a first trip line value, but are also usable to develop an ejection output for the nonhomogeneous or foreign matter when a second trip line value is exceeded.

BRIEF DESCRIPTION OF THE DRAWINGS

So that the manner in which the above-recited features, advantages, and objects of the invention, as well as others which will become apparent, are obtained and can be understood in detail, more particular description of the invention briefly summarized above may be had by reference to the embodiment thereof, which is illustrated in the drawings, which drawings form a part of the specification. It is to be noted, however, that the appended drawings illustrate only a typical embodiment of the invention and are therefore not to be considered limiting of its scope as the invention may admit to other equally effective embodiments.

FIGS. 5*a*–5*c* show the percentage frame fill for three products of different size and/or orientation.

FIG. 5*d* shows the resultant electronic signals detected at a photodetector for the respective products shown in FIGS. 5*a*–5*c*.

FIG. 5*e* shows the resultant outputs of the CCD array for the respective products shown in FIGS. 5*a*–5*c*.

FIG. 5*f* shows the corresponding corrected signals for the respective products shown in FIGS. 5*a*–5*c*.

DESCRIPTION OF THE PREFERRED EMBODIMENT

Figure 1:
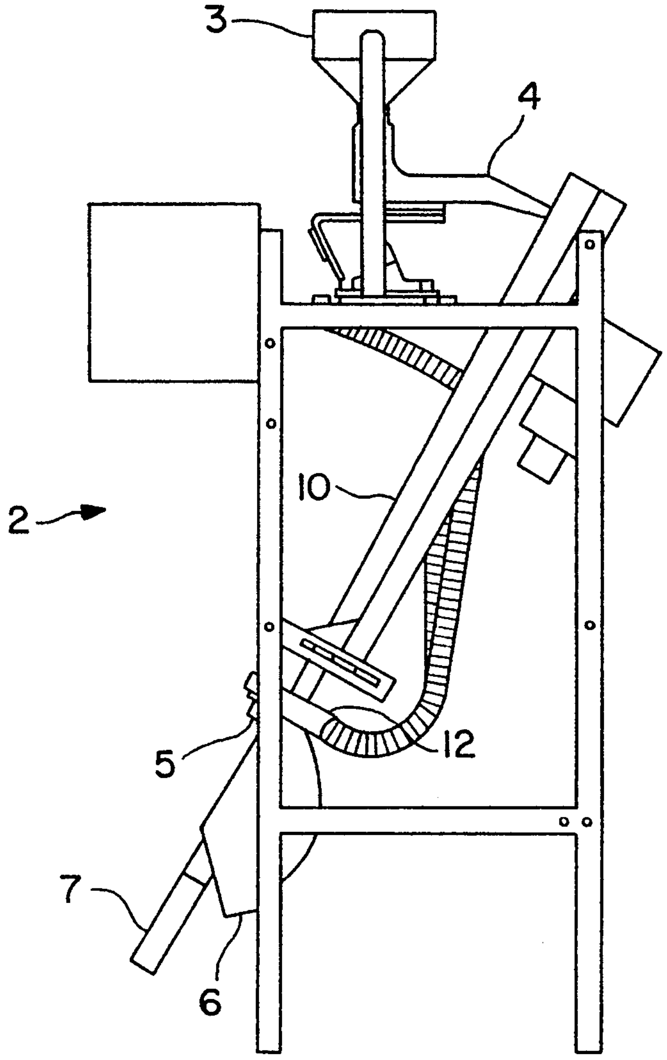
FIG. 1 PRIOR ART
FIG. 1 is a diagrammatic representation of a typical sorting machine for sorting fungible products.

Now referring to the drawings in first of FIG. 1, a machine for sorting homogeneous products, generally referred to by the number 2, is shown. From hopper 3, product is fed through feeder 4 into chute 10. Products in chute 10 pass through viewing window area 12. If a product is unacceptable, ejector 5 is activated to eject the product into reject accumulator 6.

Figure 2:
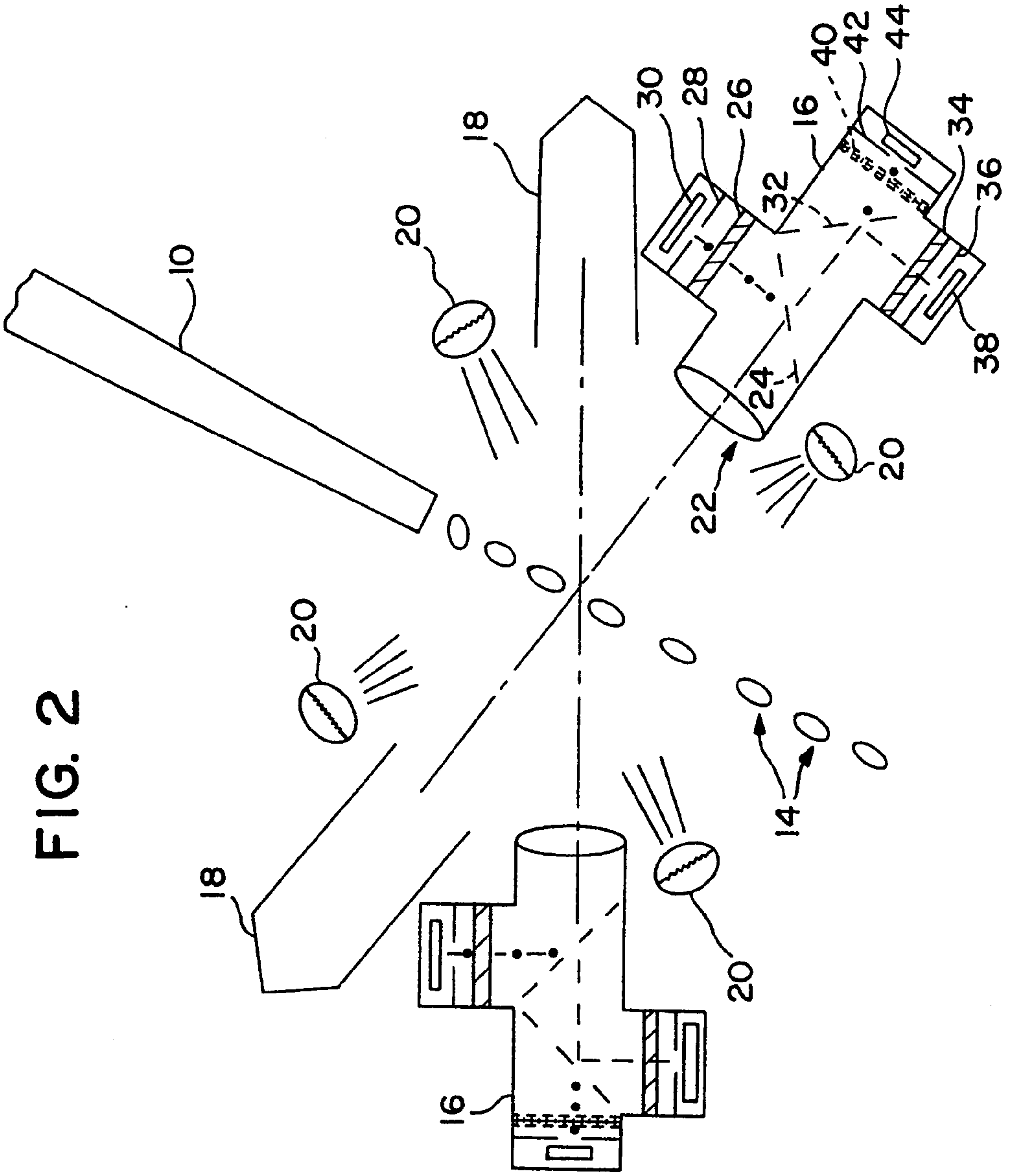
FIG. 2 shows a diagrammatic vertical cross-sectional view of the viewing station through which a product passes and the associated optics.

FIG. 2 shows a vertical cross-section of viewing frame 12. Product 14 slides down chute 10 and passes through optical station 16. Contrasting product stream backgrounds 18 are respectively aligned on the opposite side of the product stream from optical stations 16. Lamps 20 are positioned around the product stream to illuminate product 14 as it passes between the optical stations 16 and contrasting backgrounds 18.

In the illustrated preferred embodiment there are two optical stations 16 viewing the product spaced approximately 120° apart relative to chute 10 about a horizontal plane, orthogonal to the product stream. More than one optical viewing station is employed to view the product from different sides. However, only one is necessary, thus, the following discussion will be directed to only one optical system.

Light reflected from the lamps 20 off product 14 is directed into optical system 16 through lens 22. Beam splitter 24 reflects light of predetermined wavelengths through narrow band optical filter 26, past optical frame 28, and onto photodetector 30. All of the other wavelengths of light are transmitted through beam splitter 24 to beam splitter 32 which reflects second predetermined wavelengths of light through narrow band optical 34 and optical frame 36 onto photodetector 38. The remaining wavelengths of light are transmitted through beam splitter 32, past optical filter 40 (optional) and optical frame 42, and onto CCD 44, which could also be a multi-diode array.

In a typical sorting machine, backgrounds of the same percentage of the reflectivity as the product being sorting are used, such that when any abnormality in the product being sorted is detected, the change in reflectivity is detected. Photodetectors 30 and 38 produce a raw signal that is proportional to the total reflectivities of the product the background combined. To illustrate the problems with the typical sorting machine technique, refer to FIGS. 3*a*, 3*b*, and 3*c*. Each of the percentage of frame fill is indicated on the respective figures. Also, assume that the background and acceptable products both are of 50% reflectivity, that the products in FIGS. 3*a* and 3*b* have a 70% reflectivity, and the product in FIG. 3*c* has a 60% reflectivity. The following example illustrates the impact of the percentage frame fill on the accuracy of the photodetected signal produced.

Figures 3A, 3B, 3C, 3D:
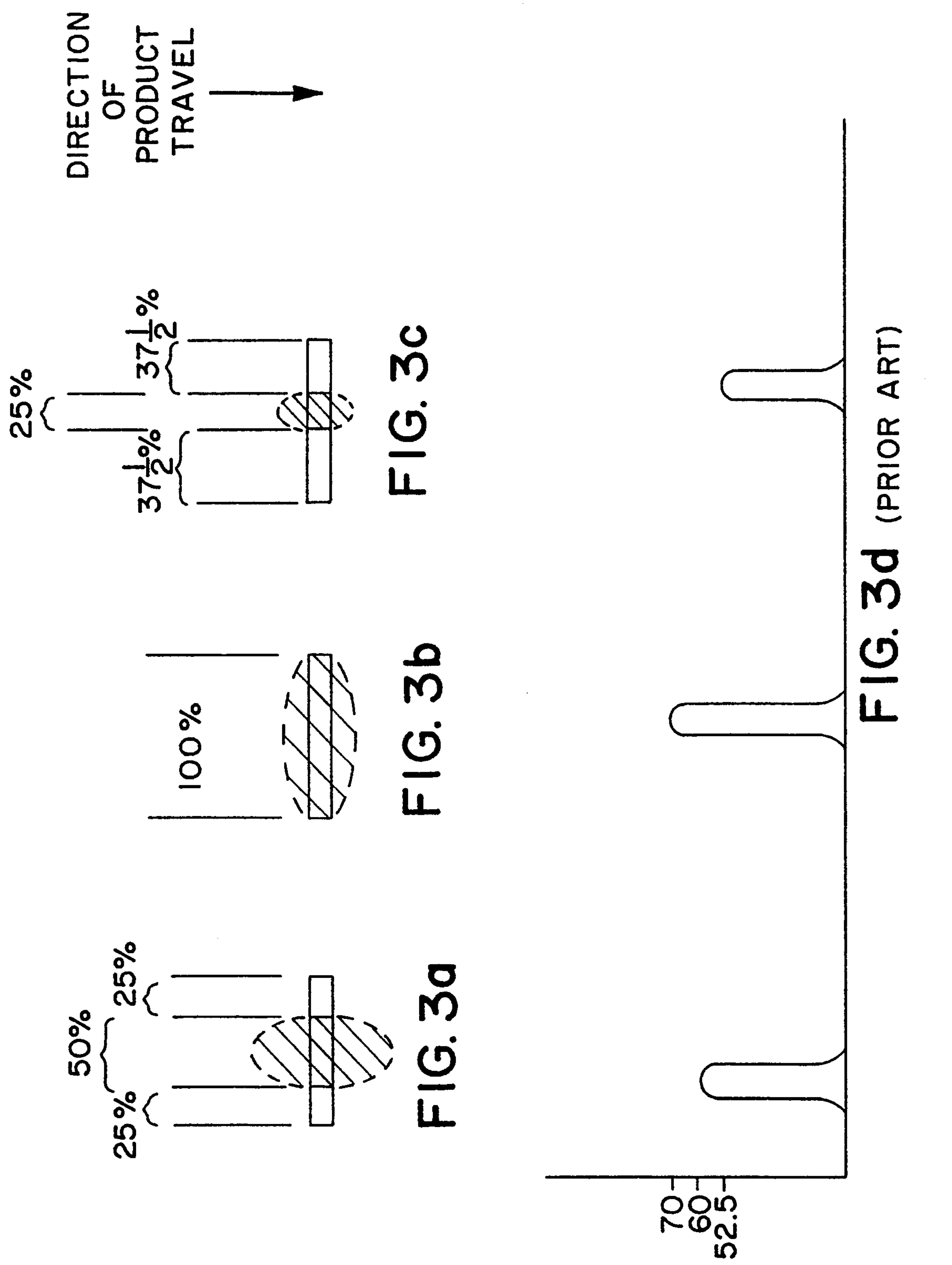
FIG. 3d (PRIOR ART)
FIGS. 3*a*–3*c* show the percentage frame fill for three products of different size and/or different orientation.
FIG. 3*d* shows the resultant electronic signals detected at a photodetector for the respective products shown in FIGS. 3*a*–3*c* in a prior art sorting machine.

When the product in FIG. 3*a* passes in front of the optical frame, the light received by the photo cell is comprised of 50% background reflectivity and 50% product reflectivity. In order to determined the total reflectivity detected at the photocell, the following equation is used:

$$(F_b\% \times R_b\%)+(F_p\% \times R_p\%)=R_t\% \quad (1)$$

were $F_b\%$ is the percentage of the frame fill due to the background, $R_b\%$ is the percentage reflectivity of the background $F_p\%$ is the percentage of the frame fill due to the product, $R_p\%$ is the percent reflectivity of the product, and $R_t\%$ is the total reflectivity due to the background and product. Using the numbers associated with the product in FIG. 3*a* and equation (1), $R_t\%$ is 60%.

Likewise, using the numbers associated with the product in FIG. 3*b* and equation (1), $R_t\%$ is 70%. Using the numbers associated with the product in FIG. 3*c* and equation (1), $R_t\%$ is 52.5%.

The signals in FIG. 3*d* are respectively representative of the signals produced by the photodetectors detecting the products in FIGS. 3*a*, 3*b*, and 3*c*. Note that the correct value for product in FIG. 3*c* should be 60% but the photocell produces a value only of 52.5%. Also note that the products in FIGS. 3*a* and 3*b* have the same percentage reflectivity, however, the total reflectivities for the respective products are different. The discrepancies are due to the varying percentage frame fills associated with the three products.

It is the addition of CCD array 44 and viewing frame 42 that allow for the correction of the signals from photodetectors 30 and 38. In the preferred embodiment of the invention, CCD array 44 spans the width of viewing frame 42, wherein the array consists of 256 detectors and the width of viewing frame 42 is the same as the width of viewing frames 28 and 36. Each of the detectors is representative of a pixel location and, therefore, can conveniently be referred to as a "pixel detector." Of course, a different number of pixel detectors from 256 can be employed, as desired.

When product 14 passes in front of optical station 16, it is detected by the pixel detectors opposite the product or the pixel detectors that are not opposite the product detect background. When the outputs of all the pixel detectors are scanned, only those pixel detectors opposite the product will produce an output larger than a predetermined trip line level representing the background level.

Figure 4:
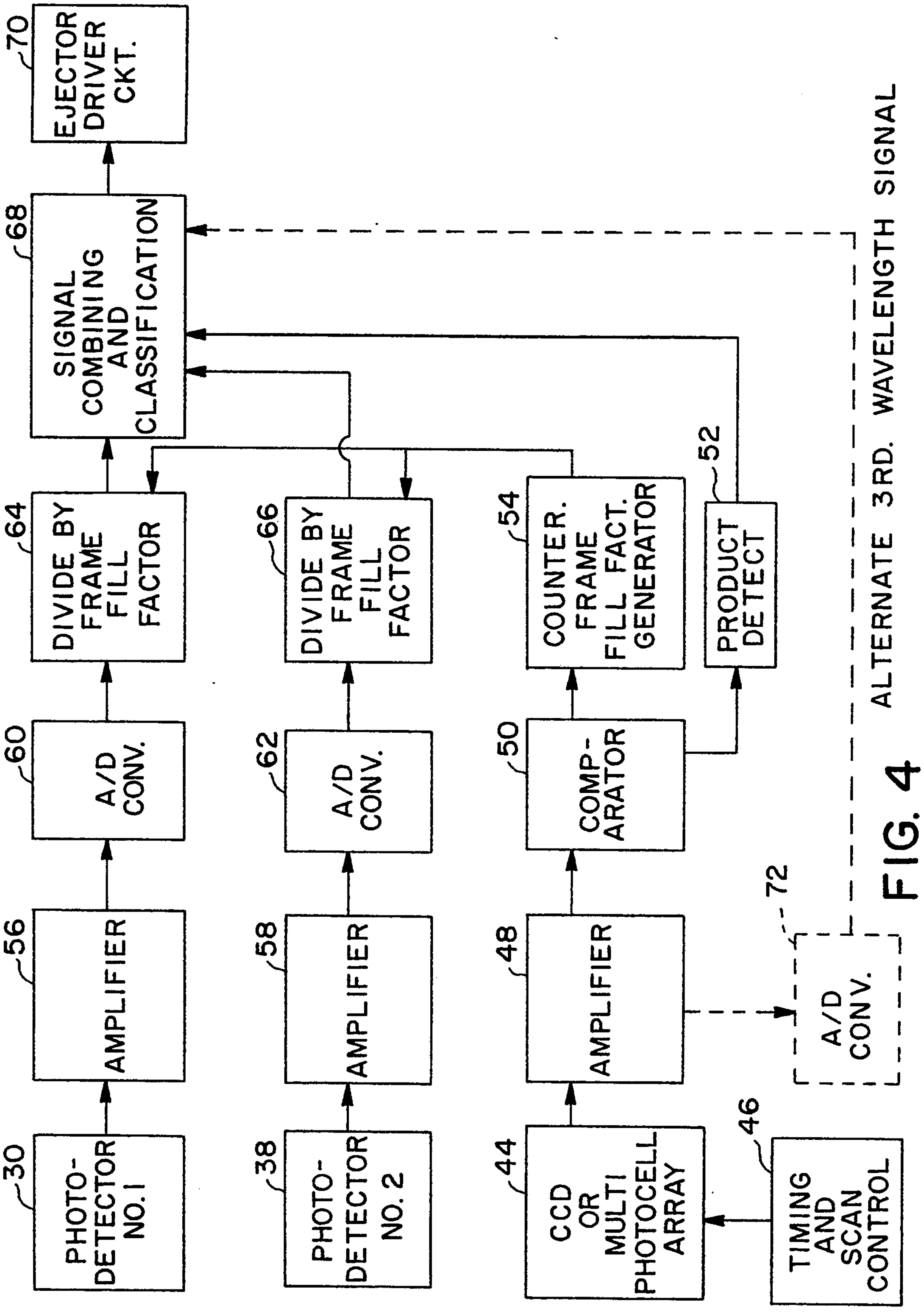
FIG. 4 is a block diagram of the electronics used to generate a corrected color classification signal for a product being sorted.

FIG. 4 shows a block diagram of the circuitry utilized in the preferred embodiment of this invention to detect at photodetector 30 and 38 two predetermined bands of light or reflectivities reflected from the product in the viewing frame and to apply the frame fill correction factor to the detected photodetector signals prior to combining the signals to generate a classification of the product in the viewing window. The frame fill factor circuitry is discussed first.

The 256 signals from CCD array 44 are consecutively scanned using a timing and scanning circuit well known to those of ordinary skill in the art. Each of the consecutive signals is amplified by amplifier 48 and compared to a predetermined trip line level representing the background level at comparator 50. In a biochromatic sorter, the output from CCD 44 is now monitored for a signal representative of a specific reflectivity. When comparator 50 produces a signal indicating that a product is in the viewing window, a product detect signal is produced by product detect circuitry 52. The output from the comparator is monitored by counter 52 which is reset each time CCD array 44 is scanned. Each time the output from a pixel detector is above the trip level value, the counter is increased by one. After a full scan of all 256 pixel detectors, the output from counter is divided by 256 using a divide by a circuit well known to those of ordinary skill in the art to produce a frame fill factor ("$F_f$") which is then used to correct the output signals from photodetector 30 and 38.

The output for photodetectors 30 and 38 are amplified by amplifiers 56 and 58 prior to being converted to digital signals at analog to digital ("A/D") converters 60 and 62. The output from the A/D converters are corrected by the frame fill factors $F_f$ by divide-by-circuit 64 and 66 to accommodate for variations in amplitude due to the size or orientation of the product being sorted. The outputs from the A/D converters are divided by the frame fill factor $F_f$. The corrected signals are then combined to classify the product, thus determining whether the product being sorted is acceptable using circuitry 68 well known to those of ordinary skill in the art, such as that described in the '211 patent. If the product is deemed unacceptable, the signal is sent to ejector driver circuit 70 to eject the product when it is opposite the ejector.

FIGS. 5*a*–5*f* show examples of the resulting signals from the circuitry shown in FIG. 5. FIGS. 5*a*, 5*b*, and 5*c* show three different products each respectively occupying a different percentage of the viewing frame. In FIG. 5*a* the product has a reflectivity of 70% and occupies 50% of the frame. The background is a very dark area and produces essentially zero reflectivity and occupies 50% of the frame. FIG. 5*b* shows a product occupying 100% of the frame with a reflectivity of 70%. FIG. 5*c* shows a product having a reflectivity of 60% occupying only 25% of the frame. FIG. 5*d* shows the respective outputs of a photodetector viewing each of the products in FIGS. 5*a*–5*c*. Substituting the numbers mentioned above into equation (1) produces the following results: the total reflectivity $R_t\%$ of the product in FIG. 5*a* is 35%, the total reflectivity $R_t\%$ of the product in FIG. 5*b* is 70%; and in the total reflectivity $R_t\%$ of the product in FIG. 5*c* is 15%. As shown, the accuracy of the resulting total reflectivities is significantly decreased by the very dark background, as opposed to using a background of the same percentage reflectivity of the product being sorted. However, the contrasting background facilitates the calculation of a frame fill factor $F_f$.

FIG. 5*e* shows the respective outputs from the CCD array for the products in FIGS. 5*a*–5*c*. Each pixel detector opposite a product produces an output above the trip line level. The number of pixel detector outputs above the trip line level are representative of the percentage frame fill. The frame fill factor $F_f$ is determined by the following equation:

$$N_{t11}/256=F_f \quad (2)$$

where $N_{t11}$ is the number of pixels detector locations producing an output above the trip line level and $F_f$ is frame fill factor.

Once the frame fill factor $F_f$ is determined, then the following equation is used to determine the corrected signal:

$$R_t\%+F_f=R_c\% \quad (3)$$

where $R_c\%$ is the total reflectivity corrected by the frame fill factor. From equation (2) and FIG. 5*e* the frame fill factor for the products shown in FIGS. 5*a*, 5*b*, and 5*c* are point 0.5, 1.0, and 0.25, respectively. Therefore, the corrected reflectivity $R_c\%$ for the products shown in FIGS. 5*a*, 5*b*, and 5*c* are 70%, 70%, and 60%, respectively, as is illustrated in FIG. 4*f*. Note that these are the actual reflectivities of the respective products.

In an alternate embodiment of the invention, the CCD array is not only used to determine detection of a signal above the trip line level, the array is used to detect a specific color band or reflectivity by incorporating optional narrow band filter 40 in front of viewing frame 42 (FIG. 2). The output from CCD array 44 after being amplified by amplifier 48 is converted by A/D converter 72 and used in classification circuitry 68 to classify the product by three reflectivities.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of producing uniform amplitude signals for products of the same detected color in a product stream that passes through a color sorting machine regardless of the amount of respective frame fill occupied by such products, which comprises establishing a viewing frame through which light is reflected from the product stream, establishing a background which contrasts with the product stream, detecting the reflected light passing through the viewing frame at a plurality of pixel locations spanning the viewing frame on a line transverse to the axis of the reflected light through the viewing frame by using a detector at each pixel location, each detector that detects background produces an output signal at a level below a predetermined trip line output value and each detector that detects the presence of a product in the product stream produces an output signal above the predetermined trip line level, combining the output of the detectors to produce a frame fill percentage output for each detected product that is a percentage of the number of pixel locations that detect the presence of the product to the total number of pixels spanning the viewing frame, photodetecting for each product in a reflected color sorting band light passing through the viewing frame and producing a raw signal with an amplitude proportional to the total contrasting lightness of the product and background in the viewing frame, and dividing the photodetected raw signal with the frame fill percentage output to produce a photodetected corrected signal so that the same lightness of photodetected product will produce the same amplitude of signal regardless of frame fill.

2. The method of claim 1, wherein the photodetecting is performed by the detectors at the plurality of pixel locations.

3. The method of claim 1, and including photodetecting a second reflected color sorting band of light passing through the viewing frame and producing a second raw signal with an amplitude proportional to the total contrasting lightness of the product and background in the viewing frame, and dividing the second photodetected raw signal with the frame fill percentage output to produce a second photodetected corrected signal so that the same lightness of the photodetected product will produce the same amplitude of signal regardless of frame fill.

4. The method of claim 3, wherein the photodetecting is performed by the detectors at the plurality of pixel locations.

5. The method of claim 3, and including photodetecting a third reflected color sorting band of light passing through the viewing frame with detectors at the plurality of pixel locations and producing a third raw signal with an amplitude proportional to the total contrasting lightness of the product and background in the viewing frame, and dividing the third photodetected raw signal with the frame fill percentage output to produce a third photodetected corrected signal so that the same lightness of the photodetected product will produce the same amplitude of signal regardless of frame fill.

6. The method of claim 1, and including dividing the number of pixel locations that detect the presence of the product by the total number of pixel locations spanning the viewing frame.

7. The method of claim 1, wherein the photodetected reflected color sorting band is different from the reflected light detected at the pixel locations spanning the viewing frame.

8. The method of claim 1, wherein said background is substantially black.

9. The method of claim 1, wherein the number of pixel locations transversely spanning the viewing frame is in the range between 100 and 300.

10. The method of claim 9, wherein the number of pixel locations transversely spanning the viewing frame is 256.

11. A method of sorting homogeneous products in a product stream that passes through a color sorting machine and ejecting non-homogeneous products from the product stream, which comprises establishing a viewing frame through which light is reflected from the product stream, a background which contrasts with the product stream, detecting the reflected light passing through the viewing frame at a plurality of pixel locations spanning the viewing frame on a line transverse to the axis of the reflected light through the viewing frame by using a detector at each pixel location, each detector that detects background produces an output signal at a level below a first predetermined trip line output value and each detector that detects the presence of a product in the product stream produces an output signal above the first predetermined trip line level value, combining the output of the detectors to produce a frame fill for each detected product that is proportional to the number of pixel locations that detect the presence of the product, dividing the frame fill output that is proportional in duration to the number of pixel locations that detect the presence of the product by the total number of pixel locations spanning the viewing frame, photodetecting light in a reflected color sorting band for each product passing through the viewing frame and producing a raw signal with an amplitude proportional to the total reflectivity in the color sorting band of the product and background in the viewing frame, dividing the photodetected raw signal with the frame fill percentage output to produce a photodetected corrected signal so that the same color of photodetected product will produce the same amplitude of signal regardless of frame fill, and producing an ejection signal for non-homogeneous products when the corrected signal exceeds a second predetermined trip level value.

12. The method of claim 11, wherein the photodetecting is performed by the detectors at the plurality of pixel locations.

13. The method of claim 11, wherein the photodetected reflected color sorting band is different from the reflected light detected at the pixel locations spanning the viewing frame.

14. The method of claim 11, wherein said background is substantially black.

15. The method of claim 11, wherein the number of pixel locations transversely spanning the viewing frame is in the range between 100 and 300.

16. The method of claim 15, wherein the number of pixel locations transversely spanning the viewing frame is 256.

17. The method of claim 11, and including photodetecting a second reflected color sorting band of light passing through the viewing frame and producing a second raw signal with an amplitude proportional to the total contrasting lightness of the product and background in the viewing frame, and dividing the second photodetected raw signal with the frame fill percentage output to produce a second photodetected corrected signal so that the same lightness of the photodetected product will produce the same amplitude of signal regardless of frame fill.

18. The method of claim 17, wherein the photodetecting is performed by the detectors at the plurality of pixel locations.

19. The method of claim 17, and including photodetecting a third reflected color sorting band of light passing through the viewing frame with detectors at the plurality of pixel locations and producing a third raw signal with an amplitude proportional to the total contrasting lightness of the product and background in the viewing frame, and dividing the third photodetected raw signal with the frame fill percentage output to produce a third photodetected corrected signal so that the same lightness of the photodetected product will produce the same amplitude of signal regardless of frame fill.

20. Apparatus for sorting homogeneous products in a product stream that passes through a color sorting machine and ejecting non-homogeneous products from the product stream, comprising at least one optical viewing assembly including a light for producing at least one reflected color sorting band of light from the products in the product stream, a background which contrasts with the product stream, a viewing frame through which reflected light from the products in the product stream passes, and a plurality of detectors of the reflected color sorting band at respective pixel locations spanning said viewing frame on a line transverse to the axis of the reflected light through the viewing frame, each detector that detects background produces an output signal at a level below a first predetermined trip line output value and each detector that detects the presence of a product in the product stream produces an output signal above the first predetermined trip line level value, output means for combining the output of the detectors to produce a frame fill output for each detected product that is proportional to the number of pixel locations that detect the presence of the product, first logic means for dividing the frame fill output that is proportional to the number of pixel locations that detect the presence of the product by the total number of pixel locations spanning the viewing frame, a photodetector for photodetecting light in a reflected color sorting band for each product passing through the viewing frame and producing a raw signal with an amplitude proportional to the total reflectivity in the color sorting band of the product and background in the viewing frame, second logic means for dividing the photodetected raw signal with the frame fill percentage output to produce a photodetected corrected signal so that the same lightness of photodetected product will produce the same amplitude of signal regardless of frame fill, and ejection means for producing an ejection signal for non-homogeneous products when the corrected signal exceeds a second predetermined trip level value.

21. Apparatus in accordance with claim 20, wherein said at least one optical viewing assembly includes a beam splitter for producing a first and a second beam of different color bands of light from the products in the product stream, a first viewing frame through which reflected light from the first beam passes, a second viewing frame of the same size as said first viewing frame and through which reflected light from the second beam passes, a third viewing frame having at least a width of the same size as said first viewing frame and through which reflected light passes, a first photodetector positioned for receiving said first beam through said first viewing frame, a second photodetector positioned for receiving said second beam through said second viewing frame, said detectors at the pixel locations being positioned for receiving reflected light through said third viewing frame, and wherein said first and second photodetectors produce respective photodetected first and second raw signals, and including a second logic means for dividing each of said first and second raw signals with the frame fill percentage output to respectively produce first and second photodetector corrected signals.

22. Apparatus for producing uniform amplitude signals for products of the same detected color in a product stream that passes through a color sorting machine regardless of the amount of respective frame fill that is occupied by such products, comprising at least one optical viewing assembly including a light for producing at least one reflected color sorting band of light from the products in the product stream, a background which contrasts with the product stream, a viewing frame through which reflected light from the products in the product stream passes, and a plurality of detectors of the reflected color sorting band at respective pixel locations spanning said viewing frame on a line transverse to the axis of the reflected light through the viewing frame, each detector that detects background produces an output signal at a level below a predetermined trip line output value and each detector that detects the presence of a product in the product stream produces an output signal above the predetermined trip line level value, and output means for combining the output of the detectors to produce a frame fill percentage output for each detected product that is a percentage of the number of pixel locations that detect the presence of the product to the total number of pixels spanning the viewing frame, a photodetector for photodetecting for each product in a reflected color sorting band light passing through the viewing frame and producing a raw signal with an amplitude proportional to the total contrasting lightness of the product and background in the viewing frame, and logic means for dividing each of the photodetected raw signals with its respective frame fill percentage output to produce a respective photodetected corrected signal so that the same lightness of photodetected product will produce the same amplitude of signal regardless of frame fill.

23. Apparatus in accordance with claim 22, wherein said detectors at the pixel locations are CCD's.

* * * * *

UNITED STATES PATENT AND TRADEMARK OFFICE

CERTIFICATE OF CORRECTION

PATENT NO. : 5,352,888

DATED : October 4, 1994

INVENTOR(S) : Joel P. Childress

It is certified that error appears in the above-indentified patent and that said Letters Patent is hereby corrected as shown below:

Column 10, line 19 before "a background" insert --establishing--.

Signed and Sealed this

Thirtieth Day of May, 1995

Attest:

BRUCE LEHMAN

*Attesting Officer*

*Commissioner of Patents and Trademarks*